(12) United States Patent
Lee et al.

(10) Patent No.: US 9,198,023 B2
(45) Date of Patent: Nov. 24, 2015

(54) METHOD AND APPARATUS FOR INITIALLY CONFIGURING WIRELESS DEVICES BY USING WIRELESS GATEWAY IN INTERNET ENVIRONMENT

(71) Applicant: Electronics and Telecommunications Research Institute, Daejeon (KR)

(72) Inventors: Eun Seo Lee, Daejeon (KR); Kwang Il Lee, Daejeon (KR); Jun Hee Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 32 days.

(21) Appl. No.: 14/161,772

(22) Filed: Jan. 23, 2014

(65) Prior Publication Data
US 2014/0206331 A1    Jul. 24, 2014

(30) Foreign Application Priority Data

Jan. 24, 2013   (KR) .................. 10-2013-0008022
Aug. 1, 2013    (KR) .................. 10-2013-0091404

(51) Int. Cl.
*H04W 76/02*    (2009.01)
*H04W 8/18*     (2009.01)
*H04W 8/00*     (2009.01)

(52) U.S. Cl.
CPC ............... *H04W 8/18* (2013.01); *H04W 8/005* (2013.01)

(58) Field of Classification Search
None
See application file for complete search history.

(56) References Cited

U.S. PATENT DOCUMENTS

| | | | |
|---|---|---|---|
| 2008/0039136 A1 | 2/2008 | Byun | |
| 2010/0120365 A1* | 5/2010 | Sim et al. | 455/41.3 |
| 2010/0302154 A1 | 12/2010 | Lee et al. | |
| 2013/0072119 A1* | 3/2013 | Park | 455/41.2 |
| 2013/0227098 A1* | 8/2013 | Nebayashi | 709/222 |
| 2014/0181916 A1* | 6/2014 | Koo et al. | 726/4 |
| 2014/0228055 A1* | 8/2014 | Karaoguz | 455/456.3 |
| 2014/0315487 A1* | 10/2014 | Lu | 455/41.1 |
| 2014/0369232 A1* | 12/2014 | Kim et al. | 370/254 |
| 2014/0373123 A1* | 12/2014 | Kang | 726/7 |
| 2015/0092233 A1* | 4/2015 | Park et al. | 358/1.15 |

* cited by examiner

*Primary Examiner* — Kimberly A Williams
(74) *Attorney, Agent, or Firm* — Rabin & Berdo, P.C.

(57) ABSTRACT

Disclosed are methods and apparatuses for initially configuring a wireless device using a wireless gateway in an Internet environment. A method of initially configuring a wireless device using a wireless gateway in an Internet environment may include receiving pairing information by a smart device from the wireless gateway, and completing pairing with a target device, the pairing information including information on the target device emitting a pairing signal to the wireless gateway.

12 Claims, 8 Drawing Sheets

METHOD AND APPARATUS FOR INITIALLY CONFIGURING WIRELESS DEVICES BY USING WIRELESS GATEWAY IN INTERNET ENVIRONMENT

CROSS-REFERENCE TO RELATED APPLICATIONS

This application claims the benefit of Korean Patent Application No. 10-2013-0008022 and of Korean Patent Application No. 10-2013-0091404, respectively filed on Jan. 24, 2013 and Aug. 1, 2013, in the Korean Intellectual Property Office, the disclosures of which are incorporated herein by reference.

BACKGROUND

1. Field of the Invention

The present invention relates to a system, an initial configuration method and an initial configuration apparatus which enable wireless devices supporting wireless interfaces such as Bluetooth and ZigBee to be connected to the Internet to provide various services to users in connection with a cloud server and a smart phone.

2. Description of the Related Art

Currently, international and domestic household appliance manufacturers are trying to provide various services to users by connecting their products to the Internet. However, devices supporting wireless interfaces, such as Bluetooth and ZigBee, have a problem of not being connected to the Internet in the absence of a Wi-Fi interface, inconvenience in a pairing procedure of initial configuration and difficulty in initial configuration of registering device and user information in a cloud server.

To solve such problems, the present invention discloses a system and a method enabling initial configuration of the foregoing devices without user's efforts, which are expected to provide an environment for manufacturers to independently develop differentiated information appliances.

SUMMARY

An aspect of the present invention is to provide a system and a method that facilitate an initial configuration process including connecting a device to a network and registering the device and a user in a cloud server without user's efforts so that devices supporting wireless interfaces such as Bluetooth and ZigBee to be connected to the Internet to provide various services to users.

Devices having Bluetooth and ZigBee interfaces currently on the market are mostly not connectable to the Internet, and involve pairing with a master device in an initial configuration process even though not connecting to the Internet, and thus users have difficulty in installing the devices. However, when the initialization method described above is easy, information appliance developing companies are considered to expand a wide range of products and services.

An aspect of the present invention provides a method of initially configuring a wireless device using a wireless gateway in an Internet environment which includes receiving pairing information by a smart device from the wireless gateway, and completing pairing with a target device, the pairing information including information on the target device emitting a pairing signal to the wireless gateway.

Another aspect of the present invention also provides a method of initially configuring a wireless device using a wireless gateway in an Internet environment which includes emitting a pairing signal by the target device to the wireless gateway, and conducting pairing with a smart device receiving a pairing signal from the wireless gateway.

Still another aspect of the present invention provides a method of initially configuring a wireless device using a wireless gateway in an Internet environment which includes receiving a pairing signal emitted by a target device, transmitting pairing information including information on the target device emitting the pairing signal, receiving a first device registration request message from the target device after the target device and the smart device are paired, and transmitting a second device registration request message to an administration server in response to reception of the first device registration request message to request registration of the target device.

According to an aspect of the present invention, there is provided a smart device including a communication unit to receive pairing information from a wireless gateway through wireless communications and a controller to conduct pairing with a target device.

The pairing information may include information on the target device that emits a pairing signal to the wireless gateway.

The communication unit may receive a device registration event message from the wireless gateway, transmit a user registration request message to an administration server, and receive a user registration response message to the user registration request message from the administration server, and the device registration event message may instruct that the target device be registered in the administration server.

The communication unit may download an application from the smart device, receive the pairing information from the wireless gateway by executing the application, download the application from a site corresponding to a quick response (QR) code attached to the target device or download the application straight from the target device using a predetermined protocol.

According to another aspect of the present invention, there is provided a wireless device including a communication unit to emit a pairing signal to a wireless gateway and a controller to conduct pairing with a smart device receiving the pairing signal from the wireless gateway.

The communication unit may transmit an address of an administration server managing a target device and information on the target device to the wireless gateway and receive a device registration response message from the wireless gateway, and the device registration response message may indicate that the target device is completely registered in the administration server.

The communication unit may transmit a device registration event message including registration completion information to the wireless gateway in response to reception of the device registration response message so that the registration completion information is transmitted to the smart device.

According to still another aspect of the present invention, there is provided a wireless gateway including a reception unit to receive a pairing signal emitted by a target device and a transmission unit to transmit pairing information including information on the target device emitting the pairing signal to a smart device.

The reception unit may receive a first device registration request message from the target device after the target device and the smart device are paired, and the transmission unit may transmit a second device registration request message to an administration server in response to reception of the first device registration request message to request registration of the target device.

The reception unit may receive a second device registration response message to the second device registration request message from the administration server and receive a first device registration event message from the target device.

The transmission unit may transmit a first device registration response message to the target device in response to reception of the second device registration response message and transmit a second device registration event message to the smart device in response to reception of the first device registration event message from the target device.

The first device registration request message may include an address of the administration server managing the target device and the information on the target device, and the second device registration request message may include the information on the target device.

As described above, embodiments provide a system facilitating an initial configuration process without user's efforts when various devices including home appliances are connected to the Internet to provide various services. This system is expected to resolve concerns that device manufacturers may not accept the foregoing service structure due to difficulty in installation process and to provide an environment for the manufacturers to independently develop differentiated information appliances.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1A:
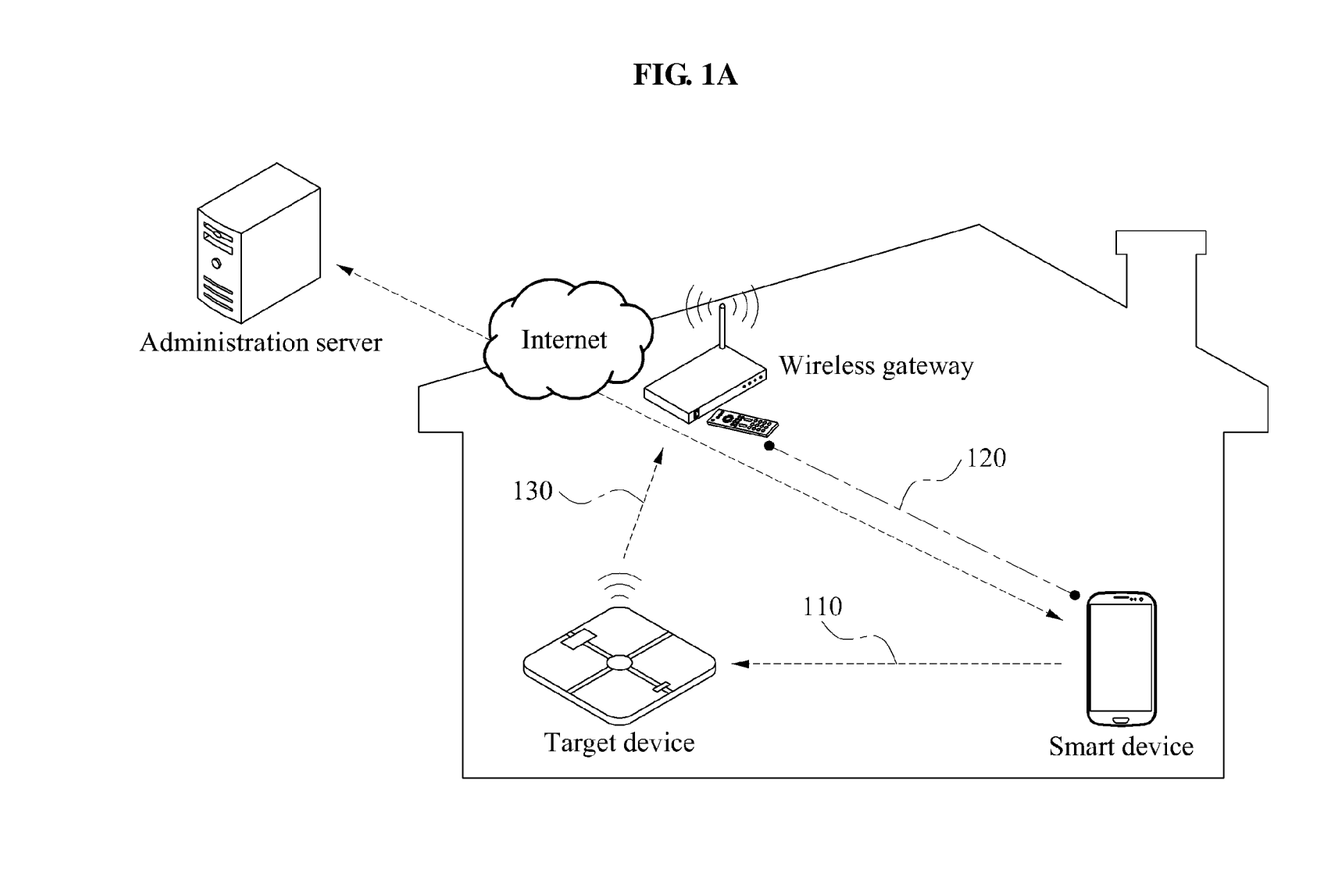
FIGS. 1A to 1C are diagrams illustrating a process of initially configuring a wireless device using a wireless gateway in an Internet environment according to an embodiment.
Figure 1B:
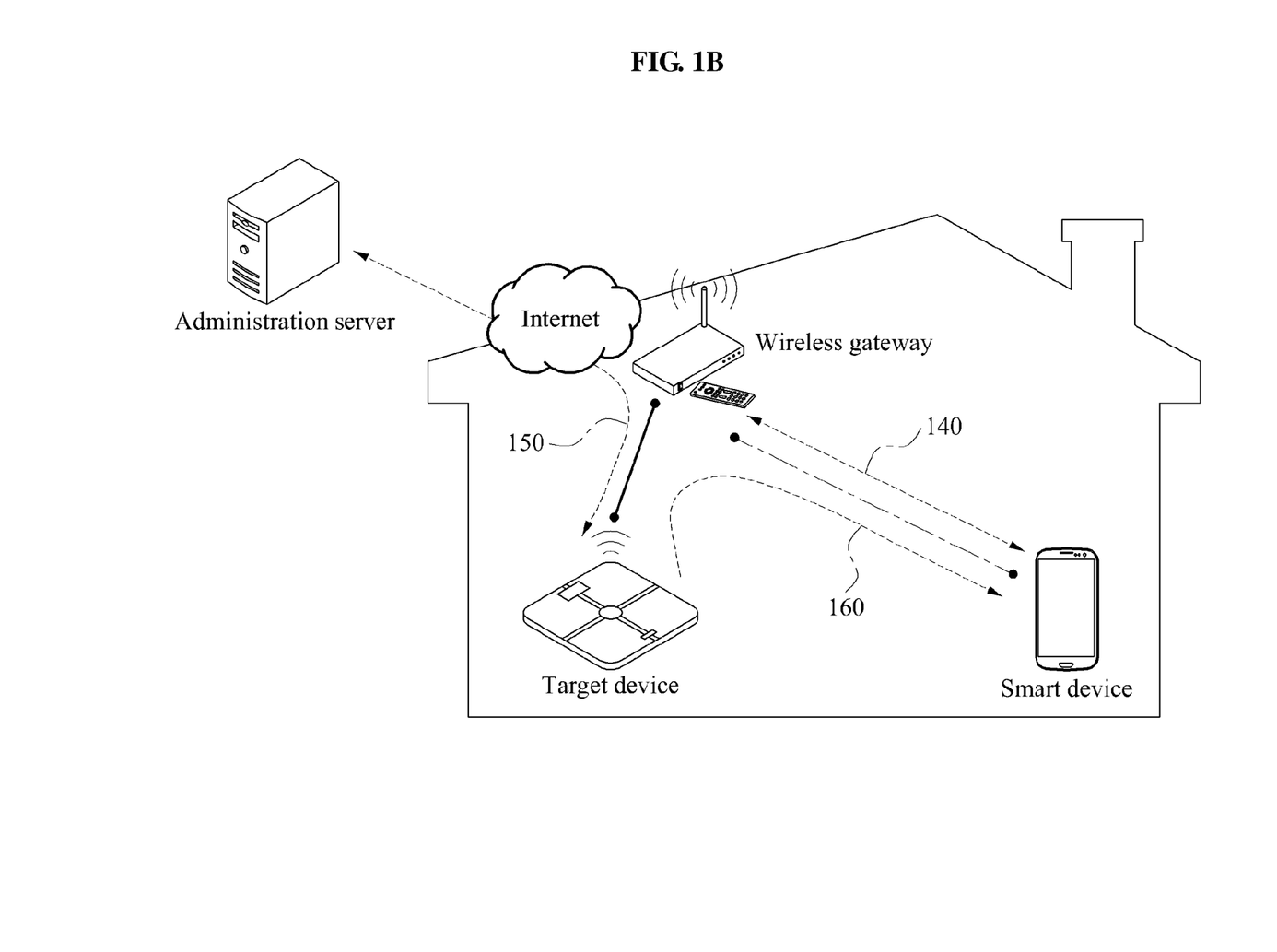
Figure 1C:
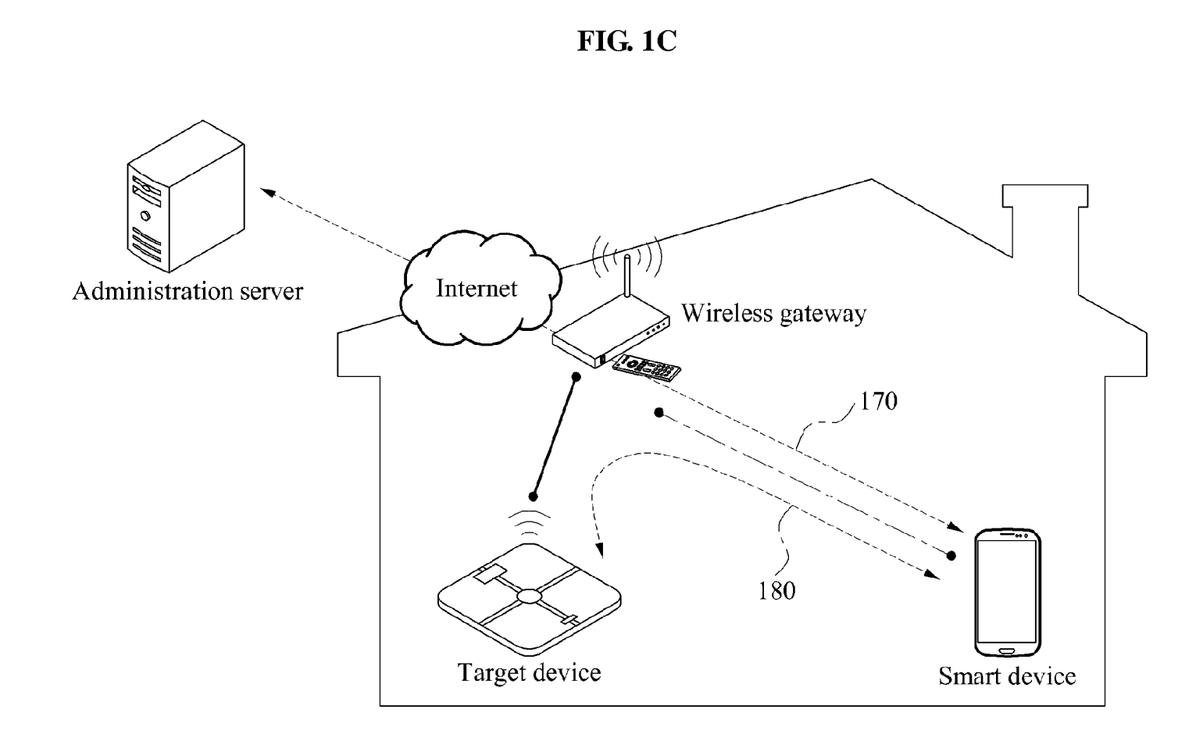

FIGS. 1A to 1C illustrate a process of initially configuring a wireless device using a wireless gateway in an Internet environment according to an embodiment.

In a system for supporting various services through the Internet using a wireless gateway, a wireless device and a smart device, the smart device may be connected to the wireless gateway through a Wi-Fi interface. The wireless device is an apparatus that provides only a local wireless interface, such as Bluetooth and ZigBee, and conducts pairing with the smart device through the wireless gateway, and will be referred to as a target device below. If the target device to provide services provides a Wi-Fi interface, the target device may communicate directly with the smart device. However, if the target device provides only a local wireless interface, such as Bluetooth and ZigBee, the wireless gateway may become a master device. Accordingly, the wireless gateway may become in a communicable state as a master device via a pairing procedure. Subsequently, an administration server, the target device and the smart device may exchange information through a device control and management protocol (DCMP) module supporting each interface. Here, various types of information related to control and maintenance of devices may be exchanged through the DCMP module using DCMPs. Examples of the DCMPs may include Advertisement, Apply, Device Control, Device Registration Request/Response, or the like.

In one embodiment, the smart device may be connected to the wireless gateway and the administration server through a WiFi interface of the wireless gateway installed in a corresponding domain.

Referring to FIG. 1A, in operation 110, the smart device may photograph a quick response (QR) code attached to the target device. Subsequently, the smart device may connect to a universal resource locator (URL) of the QR code. Here, the smart device may connect to the URL through Wi-Fi.

In operation 120, the smart device may connect to the URL of the QR code and download an application for installation from the administration server. Further, the smart device may download the application straight from the target device using a predetermined protocol. These procedures are illustrative examples of downloading the application, and a variety of alternative methods may be used to download the application. For instance, a method of downloading straight from the device using Near Field Communication (NFC) technology may be used instead of downloading through the Internet.

In operation 130, the target device may emit a pairing signal through a Bluetooth or ZigBee interface when power is switched on. When the target device powers up, the target device may emit the pairing signal to the wireless gateway. Here, the target device may transmit pairing information including information on the target device emitting the pairing signal to the wireless gateway.

Referring to FIG. 1B, in operation 140, when the smart device executes the application, a master module of the wireless gateway may transmit the information on the target device emitting the pairing signal to the master module to the smart device in connection with the DCMP module. Here, the smart device may receive the pairing information including the information on the target device emitting the pairing signal from the wireless gateway. The smart device receiving the pairing information including the information on the target device emitting the pairing signal may verify the target device transmitting the pairing information through the application. For example, a user may verify the target device transmitting the pairing information by pressing a confirm button displayed on the smart device. When the target device is verified through the application on the smart device in this way, the pairing process may be completed. Accordingly, the smart device and target device are paired.

After completion of the pairing process, the target device may transmit an address of the administration server managing the target device and information on the target device including target device information to the wireless gateway in operation 150. The information on the target device may include an ID, a manufacture's serial number and a manufacture date of the target device. Here, the target device may transmit the information on the target device in accordance with a DCMP.

The wireless gateway receiving the address of the administration server and the information on the target device may transmit a registration request message for registering the target device to the administration server connected to the Internet. When the target device is completely registered, the wireless gateway may receive a response message to registration of the target device. The wireless gateway receiving the response message may notify the target device that the target device is completely registered using the DCMP protocol through the Bluetooth or ZigBee interface.

In one embodiment, after completion of pairing, the wireless gateway may receive a first device registration request message from the target device. The wireless gateway may transmit a second device registration request message to the administration server in response to reception of the first device registration request message. The wireless gateway may request the administration server to register the target device by transmitting the second device registration request message. Here, the first device registration request message may include the address of the administration server managing the target device and the information on the target device. Also, the second device registration request message may include the information on the target device.

Subsequently, the wireless gateway may receive a second device registration response message to the second device registration request message from the administration server. The wireless gateway may transmit a first device registration response message to the target device in response to reception of the second device registration response message.

In operation 160, after information that the target device is registered in the administration server is received from the wireless gateway, the target device may notify the paired smart device through the wireless gateway that the target device is completely registered. Here, the information that the target device is completely registered may be reported using the DCMP protocol.

In one embodiment, the wireless gateway may receive a first device registration event message from the target device receiving the first device registration response message. The wireless gateway may transmit a second device registration event message to the smart device in response to reception of the first device registration event message. Here, the first and second device registration event messages may be to transmit the information that the target device is completely registered to the smart device. Also, the first and second device registration event messages may be a message including an instruction to register the target device in the administration server.

Referring to FIG. 1C, in operation 170, when a registration event message that the target device is registered is received from the wireless gateway, the smart device may receive input of information for user registration using the installed application. For instance, the information for user registration may include an account, a user name, a password, an email address, or the like. The information for user registration may be transmitted to the administration server in accordance with the DCMP. When the information for user registration is transmitted to the administration server, the initialization process may end.

In one embodiment, the smart device receiving the second device registration event message may receive input of the information for user registration using the application. The smart device may transmit a user registration request message including the input information for user registration to the administration server. The user registration request message may include an account, a name, a password and an email address of a user. Here, the user registration request message may be transmitted to the administration server in accordance with the DCMP. Subsequently, the smart device may receive a user registration response message to the user registration request message from the administration server.

In operation 180, the target device may maintain a wireless channel with the wireless gateway through the Bluetooth or ZigBee interface. For example, the target device may conduct remote control and maintenance services using the DCMP. Moreover, the target device may upload various types of information generated in the target device to the administration server. Thus, the user may retrieve various types of information related to the target device through the smart device regardless of time and place. In addition, the target device may provide the user with a customized service.

Figure 2:
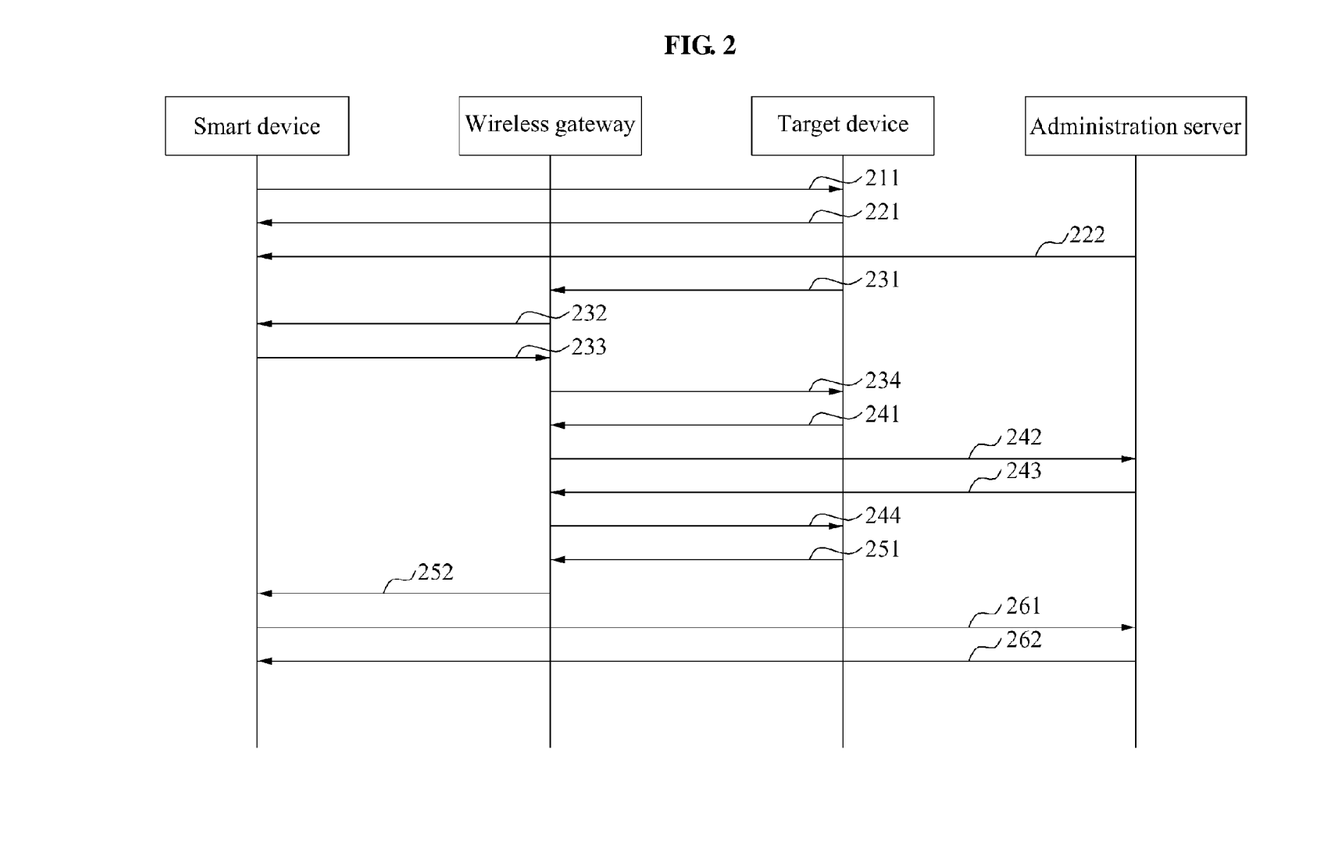
FIG. 2 is an overall flowchart illustrating a method of initially configuring a wireless device using a wireless gateway in an Internet environment according to an embodiment.

FIG. 2 is an overall flowchart illustrating a method of initially configuring a wireless device using a wireless gateway in an Internet environment according to an embodiment. The method of initially configuring the wireless device using the wireless gateway will be described in detail with reference to FIG. 2.

A smart device may be connected to a wireless gateway and an administration server through a WiFi interface of the wireless gateway installed in a corresponding domain. The smart device may download an application using various methods. For instance, in operation 221, the smart device may download an application straight from a target device using a predetermined protocol. Specifically, a method of downloading straight from the device using NFC technology may be used instead of downloading through the Internet. Also, in operation 222, the smart device may connect to a URL of a QR code and download an application for installation from the administration server. For example, the smart device may photograph a QR code attached to the target device. Subsequently, the smart device may connect to the URL of the QR code. Here, the smart device may connect to the URL of the administration server through Wi-Fi. These procedures are illustrative examples of downloading the application, and a variety of alternative methods may be used to download the application.

In operation 231, the target device may emit a pairing signal through a Bluetooth or ZigBee interface when power is switched on. When the target device powers up, the target device may emit the pairing signal to the wireless gateway. Here, the target device may transmit pairing information including information on the target device emitting the pairing signal to the wireless gateway.

In operation 232, when the smart device executes the application, a master module of the wireless gateway may transmit the information on the target device emitting the pairing signal to the master module to the smart device in connection with a DCMP module. Here, the smart device may receive the pairing information including the information on the target device emitting the pairing signal from the wireless gateway.

In operation 233, the smart device receiving the pairing information including the information on the target device emitting the pairing signal may verify the target device transmitting the pairing information through the application. For example, a user may verify the target device transmitting the pairing information by pressing a confirm button displayed on the smart device. Then, the smart device may transmit a first pairing completion message to the wireless gateway.

In operation 234, the wireless gateway receiving the first pairing completion message from the smart device may transmit a second pairing completion message to the target device.

When the target device is verified through the application on the smart device in this way, the smart device and target device are paired.

After completion of the pairing process, in operation 241, the target device may transmit an address of the administration server managing the target device and information on the target device including target device information to the wireless gateway. The information on the target device may include an ID, a manufacture's serial number and a manufacture date of the target device. Here, the target device may transmit the information on the target device in accordance with a DCMP.

In operation 242, the wireless gateway receiving the address of the administration server and the information on the target device may transmit a registration request message for registering the target device to the administration server connected to the Internet. In operation 243, when the target device is completely registered, the wireless gateway may receive a response message to registration of the target device. In operation 244, the wireless gateway receiving the response message may notify the target device that the target device is completely registered using the DCMP protocol through the Bluetooth or ZigBee interface. Operations 242 to 244 are described in detail with reference to the following examples.

In one embodiment, after completion of pairing, the wireless gateway may receive a first device registration request message from the target device. The wireless gateway may transmit a second device registration request message to the administration server in response to reception of the first device registration request message. The wireless gateway may request the administration server to register the target device by transmitting the second device registration request message. Here, the first device registration message may include the address of the administration server managing the target device and the information on the target device. Also, the second device registration request message may include the information on the target device.

Subsequently, the wireless gateway may receive a second device registration response message to the second device registration request message from the administration server. The wireless gateway may transmit a first device registration response message to the target device in response to reception of the second device registration response message.

After information that the target device is registered in the administration server is received from the wireless gateway, in operation 251, the target device may notify the wireless gateway back that the target device is completely registered. In operation 252, the wireless gateway may notify the smart device paired with the target device of the information that the target device is completely registered. Here, the information that the target device is completely registered may be reported using the DCMP protocol.

In one embodiment, the wireless gateway may receive a first device registration event message from the target device receiving the first device registration response message. The wireless gateway may transmit a second device registration event message to the smart device in response to reception of the first device registration event message. Here, the first and second device registration event messages may be to transmit the information that the target device is completely registered to the smart device. Also, the first and second device registration event messages may be a message including an instruction to register the target device in the administration server.

In operation 261, the smart device may receive input of information for user registration using the installed application. For instance, the information for user registration may include an account, a user name, a password, an email address, or the like. The information for user registration may be transmitted to the administration server in accordance with the DCMP. When the information for user registration is transmitted to the administration server, the initialization process may end.

In one embodiment, the smart device receiving the second device registration event message may receive input of the information for user registration using the application. The smart device may transmit a user registration request message including the input information for user registration to the administration server. The user registration request message may include an account, a name, a password and an email address of a user. Here, the user registration request message may be transmitted to the administration server in accordance with the DCMP.

Subsequently, in operation 262, the smart device may receive a user registration response message to the user registration request message from the administration server.

The target device that completes the initialization process may maintain a wireless channel with the wireless gateway through the Bluetooth or ZigBee interface. For example, the target device may conduct remote control and maintenance services using the DCMP. Moreover, the target device may upload various types of information generated in the target device to the administration server. Thus, the user may retrieve various types of information related to the target device through the smart device regardless of time and place. In addition, the target device may provide the user with a customized service.

Figure 3:
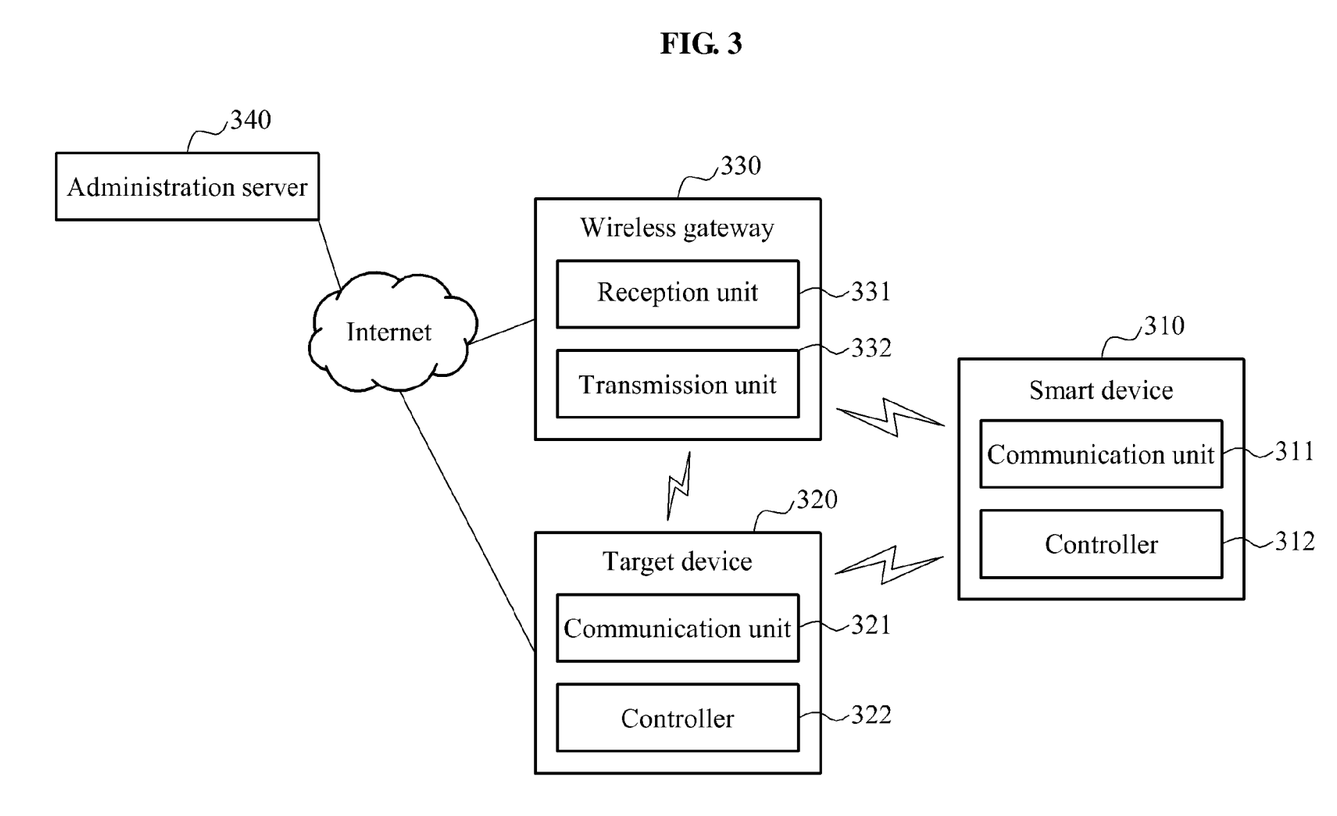
FIG. 3 is a diagram illustrating a configuration of a system of initially configuring a wireless device using a wireless gateway in an Internet environment according to an embodiment.

FIG. 3 illustrates a configuration of a system of initially configuring a wireless device using a wireless gateway in an Internet environment according to an embodiment.

Referring to FIG. 3, the system of initially configuring the wireless device using the wireless gateway includes a smart device 310, a target device 320, a wireless gateway 330, and an administration server 340.

The smart device 310 may include a communication unit 311 and a controller 312.

The communication unit 311 of the smart device 310 may receive pairing information from the wireless gateway 330 through wireless communications. The communication unit 311 may also receive a device registration event message from the wireless gateway 330 and transmits a user registration request message to the administration server 340. Furthermore, the communication unit 311 may transmit the user registration request message to the administration server 340 and receive a user registration response message to the user registration request message from the administration server 340.

In one embodiment, the communication unit 311 may be connected to the wireless gateway 330 and the administration server 340 through a Wi-Fi interface of the wireless gateway 330 installed in a corresponding domain. The communication unit 311 of the smart device may download an application from the administration server 340. Various methods may be used for the communication unit 311 to download an application. For instance, the communication unit 311 may download the application straight from the target device 320 using a predetermined protocol. Specifically, the communication unit 311 may download the application straight from the device using Near Field Communication (NFC) technology, not through the Internet. Also, the communication unit 311 may connect to a URL of a QR code to download an application for installation from the administration server 340. For example, the smart device may photograph a QR code attached to the target device 330. Subsequently, the communication unit 311 of the smart device may connect to the URL of the QR code. Here, the communication unit 311 may connect to the URL of the administration server 340 through Wi-Fi. These procedures are illustrative examples of downloading the application, and a variety of alternative methods may be used to download the application.

When the smart device 310 executes the application, a master module of the wireless gateway 330 may transmit information on the target device 320 emitting a pairing signal to the master module to the smart device 310 in connection with a DCMP module. Here, the communication unit 311 may receive pairing information including the information on the target device 320 emitting the pairing signal from the wireless gateway 330. The smart device 310 paired with the target device 320 emitting the pairing signal may transmit a first pairing completion message to the wireless gateway 330.

The controller 312 of the smart device 310 may conduct pairing with the target device 320. The smart device receiving the pairing information including the information on the target device emitting the pairing signal may verify the target device 320 transmitting the pairing information through the application. For example, a user may verify the target device 320 transmitting the pairing information by pressing a confirm button displayed on the smart device 310.

The target device 320 may include a communication unit 321 and a controller 322.

The communication unit 321 of the target device 320 may emit the pairing signal to the wireless gateway 330. The communication unit 321 of the target device 320 may emit the pairing signal through a Bluetooth or ZigBee interface when power is switched on. When the target device 320 powers up, the target device 320 may emit the pairing signal to the wireless gateway 330. Here, the target device 320 may transmit the pairing information including information on the target device 320 emitting the pairing signal to the wireless gateway 330.

The communication unit 321 of the target device 320 may transmit an address of the administration server 340 managing the target device 320 and the information on the target device 320 to the wireless gateway 330 and may receive a device registration response message from the wireless gateway 330.

After completion of the pairing process, the communication unit 321 of the target device 320 may transmit the address of the administration server managing the target device 320 and the information on the target device including target device information to the wireless gateway 330. The information on the target device 320 may include an ID, a manufacture's serial number and a manufacture date of the target device 320. Here, the target device 320 may transmit the information on the target device in accordance with a DCMP. Further, the communication unit 321 may transmit a device registration event message including registration completion information to the wireless gateway 330 in response to reception the device registration response message so that the registration completion information is transmitted to the smart device.

The controller 322 of the target device 320 may conduct pairing with the smart device 310 receiving the pairing information from the wireless gateway 330.

The wireless gateway 330 may include a reception unit 331 and a transmission unit 332.

The reception unit 331 may receive the pairing signal emitted by the target device 320. Also, after the target device 320 and the smart device 310 are completely paired, the reception unit 331 may receive the first pairing completion message from the smart device 310 and receive a first device registration request message from the target device 320. Here, the first device registration request message may include the address of the administration server 340 managing the target device 320 and the information on the target device 320. The reception unit 331 may receive a second device registration response message to a second device registration request message from the administration server 340 and a first device registration event message from the target device 320.

The transmission unit 322 may transmit the pairing information including the information on the target device 320 emitting the pairing signal to the smart device 310. The wireless gateway receiving the first pairing completion message from the smart device 310 may transmit a second pairing completion message to the target device 320. Also, the wireless gateway may transmit a second device registration request message to the administration server 340 in response to reception of the first device registration request message to request registration of the target device 320. Here, the second device registration request message may include the information on the target device 320.

The transmission unit 332 may transmit a first device registration response message to the target device 320 in response to reception of the second device registration response message and transmit a second device registration event message to the smart device 310 in response to reception of the first device registration event message from the target device 320.

In one embodiment, after pairing is completed, the reception unit 331 of the wireless gateway 330 may receive the first device registration request message from the communication unit 321 of the target device 320. The transmission unit 332 of the wireless gateway 330 may transmit the second device registration request message to the administration server 340 in response to reception of the first device registration request message. The wireless gateway 330 may request the administration server 340 to register the target device 320 by transmitting the second device registration request message to the administration server 340. Here, the first device registration request message may include the address of the administration server 340 managing the target device 320 and the information on the target device 320. Also, the second device registration request message may include the information on the target device 320.

Subsequently, the reception unit 332 of the wireless gateway 330 may receive a second device registration response message to the second device registration request message from the administration server 340. The transmission unit 332 of the wireless gateway 330 may transmit the first device registration response message to the target device 320 in response to reception of the second device registration response message.

After information that the target device 320 is registered in the administration server 340 is received from the transmission unit 332 of the wireless gateway 330, the communication unit 321 of the target device 320 may notify the wireless gateway 330 back that the target device 320 is completely registered. The transmission unit 332 of the wireless gateway 330 may notify the smart device 310 paired with the target device 320 of the information that the target device 320 is completely registered. Here, the information that the target device 320 is completely registered may be reported using the DCMP protocol.

In one embodiment, the reception unit 331 of the wireless gateway 330 may receive the first device registration event message from the target device 320 receiving the first device registration response message. The transmission unit 332 of the wireless gateway 330 may transmit a second device registration event message to the smart device 310 in response to reception of the first device registration event message. Here, the first and second device registration event messages may be to transmit the information that the target device 320 is completely registered to the smart device 310. Also, the first and second device registration event messages may be a message including an instruction to register the target device 320 in the administration server 340.

The smart device 310 may receive input of information for user registration using the installed application. For instance, the information for user registration may include an account, a user name, a password, an email address, or the like. The information for user registration may be transmitted to the administration server 340 in accordance with the DCMP. When the information for user registration is transmitted to the administration server 340, the initialization process may end.

In one embodiment, the smart device 310 receiving the second device registration event message may receive input of the information for user registration using the application. The smart device 310 may transmit a user registration request message including the input information for user registration to the administration server 340. The user registration request message may include an account, a name, a password and an email address of a user. Here, the user registration request message may be transmitted to the administration server 340 in accordance with the DCMP.

The communication unit 311 of the smart device 310 may receive a user registration response message to the user registration request message from the administration server 340.

The target device 320 that completes the initialization process may maintain a wireless channel with the wireless gateway 330 through the Bluetooth or ZigBee interface. For example, the target device 320 may conduct remote control and maintenance services using the DCMP. Moreover, the target device 320 may upload various types of information generated in the target device 320 to the administration server 340. Thus, the user may retrieve various types of information related to the target device 320 through the smart device 310 regardless of time and place. In addition, the target device 320 may provide the user with a customized service.

Figure 4:
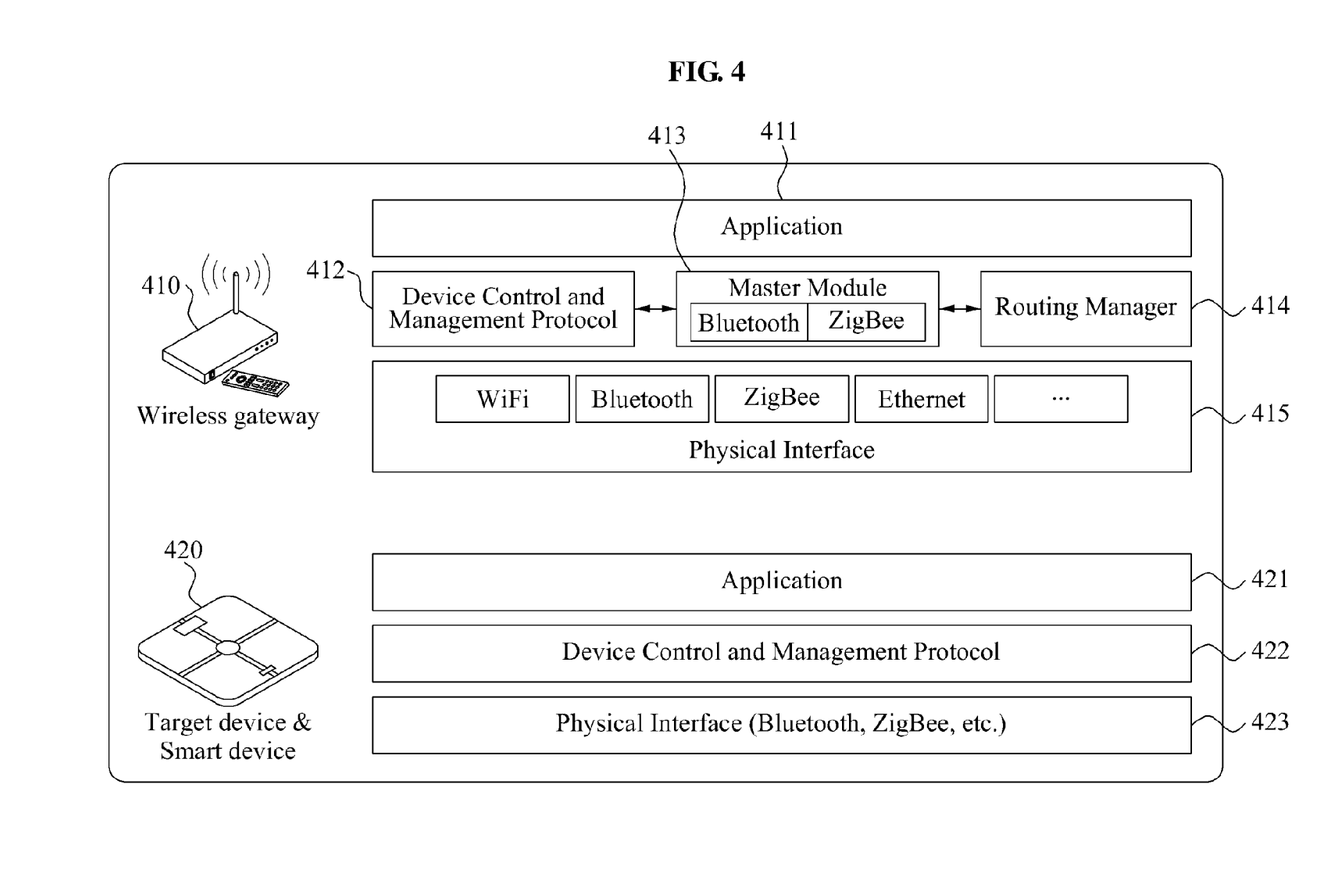
FIG. 4 is a diagram illustrating layers of a wireless gateway, a target device and a smart device according to an embodiment.

FIG. 4 illustrates layers of a wireless gateway, a target device and a smart device according to an embodiment.

FIG. 4 illustrates the layers of the wireless gateway, the target device and the smart device for performing an initialization process in which devices supporting wireless interfaces such as Bluetooth and ZigBee are easily connected to the Internet to provide the foregoing services.

The wireless gateway 410 may include layers of an Application 411, a DCMP module 412, a Master Module 413, a Routing Manager 414 and a Physical Interface 415.

The DCMP module 412 may transmit information according to a DCMP. The DCMP module 412 will be described in detail with reference to FIG. 5.

The Master Module 413 may transmit information according to a Bluetooth or ZigBee protocol.

The Physical Interface 415 may need to support Wi-Fi interface and routing functions to serve as a wireless router and also provide a wireless interface such as Bluetooth and ZigBee.

The wireless gateway 410 operates as a master for communications with the target device and the smart device that have a Bluetooth or ZigBee interface. The wireless gateway 410 may be managed with a unique ID as devices using a Wi-Fi or Ethernet interface are managed with an IP and a port through the routing manager 414. The wireless gateway 410 may include the DCMP module for supporting initial configuration, remote control and maintenance of the wireless gateway 410 and the target device and the smart device connected to the wireless gateway 410.

The target device and the smart device 420 may include layers of an Application 421, a DCMP module 422 and a Physical Interface 423. The DCMP module 422 will be described in detail with reference to FIG. 5.

Figure 5:
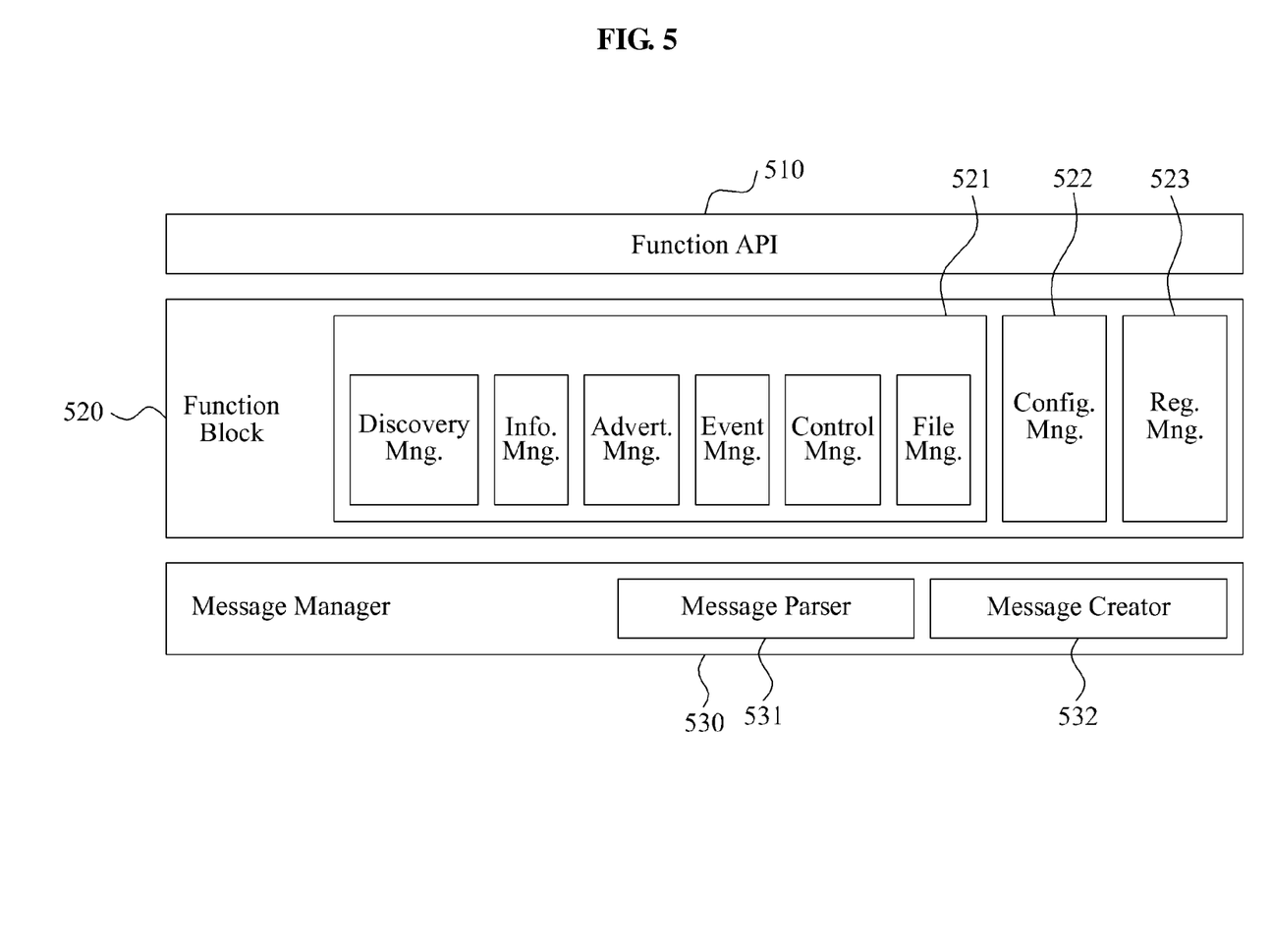
FIG. 5 is a diagram illustrating a structure of a DCMP module according to an embodiment.

FIG. 5 illustrates a structure of a DCMP module according to an embodiment.

The wireless gateway, the target device, the smart device and the administration server may need to support the structure of the DCMP module shown in FIG. 5 so as to provide the foregoing services.

The DCMP module may include a Function Application Program Interface (API) 510, a Function Block 520 and a Message Manager 530.

The Function API 510 may manage a language or a message format used for communications.

The Function Block 520 may include a Basic Function Manager 521, a Configure Manager 522 and a Register Manager 523

The Basic Function Manager 521 of the Function Block 520 for processing various types of information according to a corresponding message may include a Discovery Manager, an Information Manager, an Advertise Manager, an Event Manager, a Control Manager and a File Manager for processing basic functions needed for initialization.

The Configure Manager 522 may substantially generate a communication channel and perform a relevant function.

The Register Manager 523 may conduct device registration and user registration. Further, each function block may be linked to an application through the Function API 510.

The Message Manager 530 may include a Message Parser 531 and a Message Creator 632.

The Message Parser 531 may analyze various messages needed for initial configuration, and the Message Creator 532 may create a message.

Figure 6:
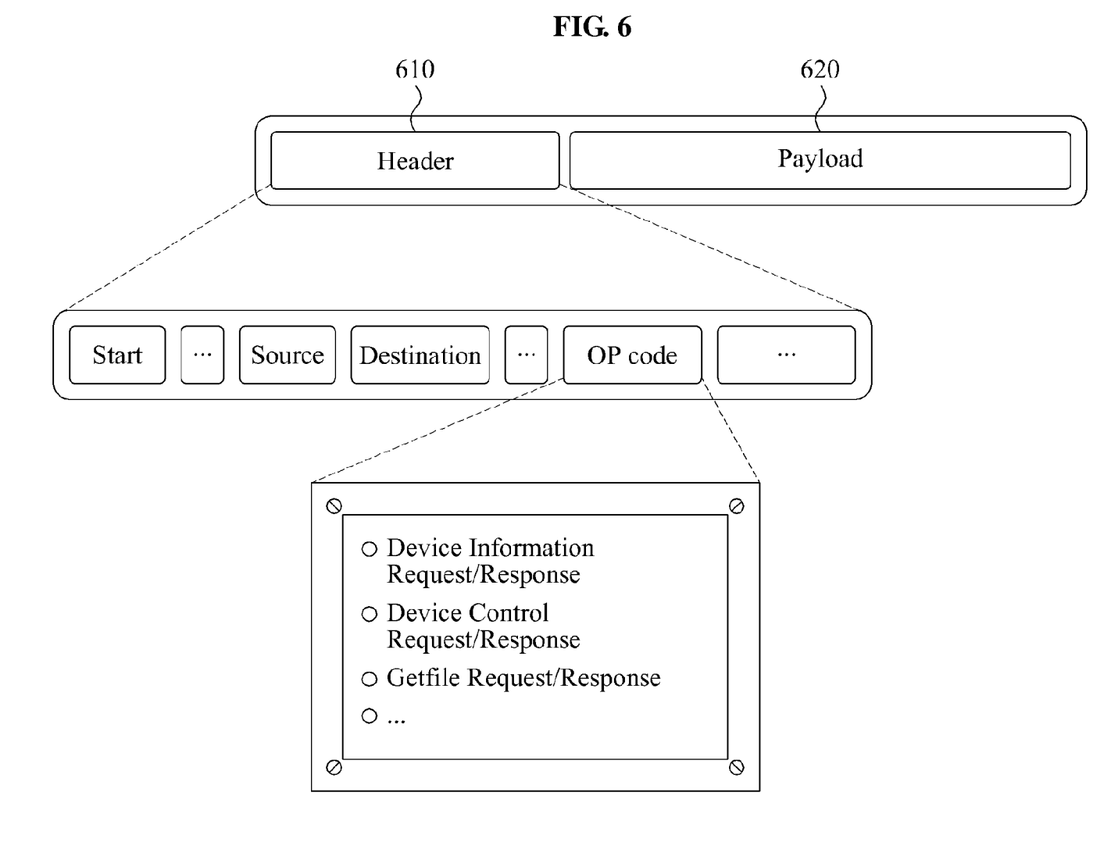
FIG. 6 is a diagram illustrating a structure of a message used for initial configuration of a device according to an embodiment.

FIG. 6 illustrates a structure of a message used for initial configuration of a device according to an embodiment.

Information on a device needed for initial configuration of the device and a message structure for registration of the device and a service may be the same as shown in FIG. 6.

The message used for initial configuration of the device may include a Header 610 and a Payload 620.

The Header 610 may be formed of a binary stream, and the Payload 620 may be formed of XML. The Header 610 may include a start signal, a source device ID, a target device ID, an OP code and an end signal. Various functions provided through the message may be defined in the OP code. Thus, when the message is received, the system for supporting various services through the Internet using the wireless gateway, the target device and the smart device may basically analyze the Header 610 and transmit the Payload 620 to a corresponding administration module according to the OP code. A structure of the Header 610 according to one embodiment is illustrated in Table 1.

TABLE 1

| Field Name | Byte | Description |
| --- | --- | --- |
| MessageStart | 2 | Magic Code indicating start of message |
| Version | 1 | DA protocol version (=1) |
| Flag | 1 | Urgent |
| Length | 4 | Message size (including header) |
| Message ID | 4 | Payload XML ID |
| Sequence Number | 4 | Partial sequence number for specific XML |
| Source ID | 20 | Message creation node ID |

TABLE 1-continued

| Field Name | Byte | Description |
|---|---|---|
| Destination ID | 20 | Message destination node ID |
| OP Code | 2 | Operation code |
| Transaction ID | 4 | Transaction identifier, Time at which request transaction is first initialized |
| CRC | 4 | Message error verification code |
| Optional Header/Data | Variable | Variable header dependent on OP code or user-defined data |
| MessageEnd | 2 | Magic code indicating end of message |

Functions provided through the message may be provided through the OP code included in the Header 610. Major functions provided through the OP code may include functions for automatic configuration and remote maintenance of the device, such as providing device and status information, Zero configuration, Remote Diagnostic and Healing, details of which are illustrated in Table 2.

TABLE 2

| Transaction | OP Name | Code | Description |
|---|---|---|---|
| Device Registration | Device Registration Request | 0x1111 | Registration request and response of device |
|  | Device Registration Response | 0x1112 |  |
| Service Registration | Device Registration Request | 0x1111 | Register/add/delete user |
|  | Device Registration Response | 0x1112 |  |
| Device Info | DEVICE_INFO_REQUEST | 0x2011 | Device and function info |
|  | DEVICE_INFOR_RESPONSE | 0x2012 |  |
| Device Control | DEVICE_CONTROL_REQUEST | 0x2111 | Control device |
|  | DEVICE_CONTROL_RESPONSE | 0x2112 |  |
| Event | EVENT NOTIFICATION | 0x2FF1 | Device status change sensor data |
| Event Subscription | EVENT_SUBSCRIPTION_REQUEST | 0x2F11 | Request service registration and deregistration Request results |
|  | EVENT_SUBSCRIPTION_RESPONSE | 0x2F12 |  |
| GET FILE INFO | GET_FILEINFO_REQUEST | 0x2211 | Request file info |
|  | GET_FILEINFO_RESPONSE | 0x2212 | File info request result |
| GET FILE | GET_FILE_REQUEST | 0x2221 | Request file transmission |
|  | GET_FILE_RESPONSE | 0x2222 |  |
|  | GET_FILE_RESULT | 0x2223 | File transmission result |
| PUT FILE | PUT_FILE_REQUEST | 0x2231 | Request file reception acceptance Whether file reception request is accepted Transmit file transmission result |
|  | PUT_FILE_RESPONSE | 0x2232 |  |
|  | PUT_FILE_RESULT | 0x2233 |  |
| APPLY | APPLY_REQUEST | 0x2311 | Rollback |
|  | APPLY_RESPONSE | 0x2312 | FILE (EXE, |
|  | APPLY_RESULT | 0x2313 | FIRMWAVE, Configuration, . . . ) |

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A smart device comprising:
    a communication unit to receive pairing information from a wireless gateway through wireless communications; and
    a controller to conduct pairing with a target device, wherein the pairing information comprises information on the target device that emits a pairing signal to the wireless gateway,
    the communication unit receives a device registration event message from the wireless gateway, transmits a user registration request message to an administration server, and receives a user registration response message to the user registration request message from the administration server, and
    the device registration event message instructs that the target device be registered in the administration server.

2. The smart device of claim 1, wherein the communication unit downloads an application from the smart device and receives the pairing information from the wireless gateway by executing the application, and when the application is downloaded from the smart device, the communication unit downloads the application from a site corresponding to a quick response (QR) code attached to the target device or downloads the application straight from the target device using a predetermined protocol.

3. A wireless device comprising:
    a communication unit to emit a pairing signal to a wireless gateway; and
    a controller to conduct pairing with a smart device receiving the pairing signal from the wireless gateway, wherein
    the communication unit transmits an address of an administration server managing a target device and information on the target device to the wireless gateway and receives a device registration response message from the wireless gateway, and
    the device registration response message indicates that the target device is completely registered in the administration server.

4. The wireless device of claim 3, wherein the communication unit transmits a device registration event message comprising registration completion information to the wireless gateway in response to reception of the device registration response message so that the registration completion information is transmitted to the smart device.

5. A wireless gateway comprising:
    a reception unit to receive a pairing signal emitted by a target device; and
    a transmission unit to transmit, to a smart device, pairing information comprising information on the target device emitting the pairing signal,
    wherein the reception unit receives a first device registration request message from the target device after the target device and the smart device are paired, and
    the transmission unit transmits a second device registration request message to an administration server in response to reception of the first device registration request message to request registration of the target device.

6. The wireless gateway of claim 5, wherein the reception unit receives a second device registration response message to the second device registration request message from the administration server and receives a first device registration event message from the target device.

7. The wireless gateway of claim 5, wherein the transmission unit transmits a first device registration response message to the target device in response to reception of the second device registration response message and transmits a second device registration event message to the smart device in response to reception of the first device registration event message from the target device.

8. The wireless gateway of claim 6, wherein the first device registration request message comprises an address of the administration server managing the target device and the information on the target device, and the second device registration request message comprises the information on the target device.

9. A method of initially configuring a wireless device, the method comprising:
    receiving a pairing signal emitted by a target device;
    transmitting pairing information comprising information on the target device that emits the pairing signal to a smart device;
    receiving a first device registration request message from the target device after the target device and the smart device are paired; and
    transmitting a second device registration request message to an administration server in response to reception of the first device registration request message to request registration of the target device.

10. The method of claim 9, further comprising:
    receiving a second device registration response message to the second device registration request message from the administration server; and
    transmitting a first device registration response message to the target device in response to reception of the second device registration response message.

11. The method of claim 10, further comprising:
    receiving a first device registration event message from the target device; and
    transmitting a second device registration event message to the smart device in response to reception the first device registration event message.

12. The method of claim 9, wherein the first device registration request message comprises an address of the administration server managing the target device and the information on the target device, and the second device registration request message comprises the information on the target device.

* * * * *